Figure 4:
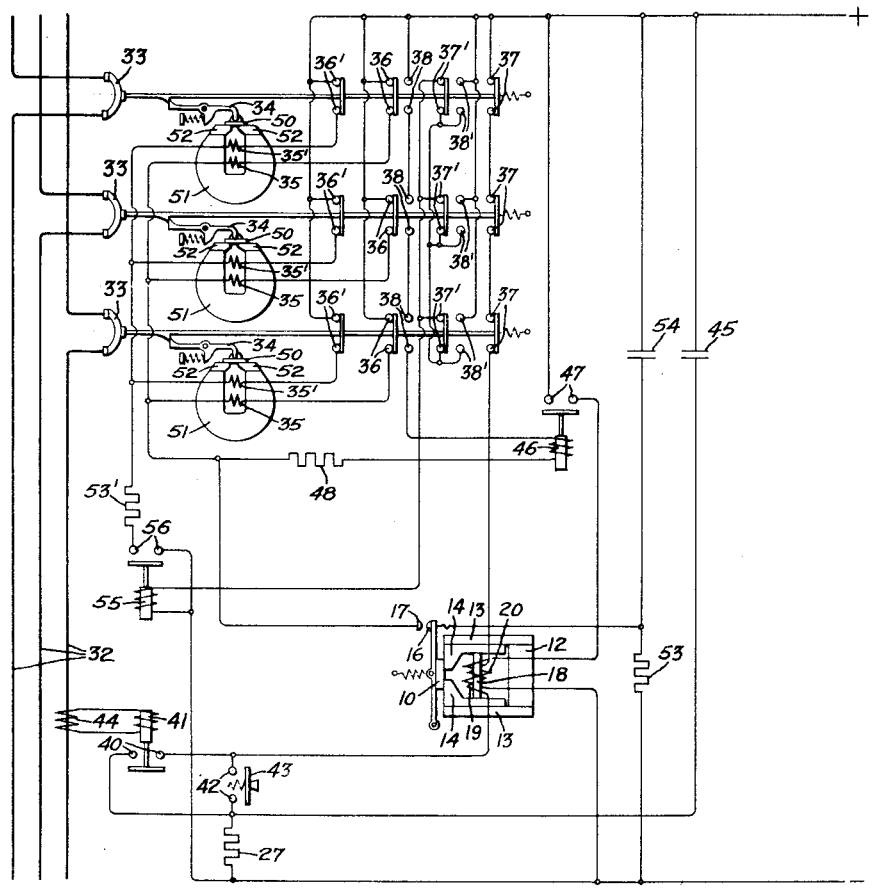

Sept. 20, 1938.                E. W. BOEHNE                 2,130,870
                    PROTECTIVE CONTROL DEVICE AND SYSTEM
                    Filed Aug. 4, 1936          2 Sheets-Sheet 1
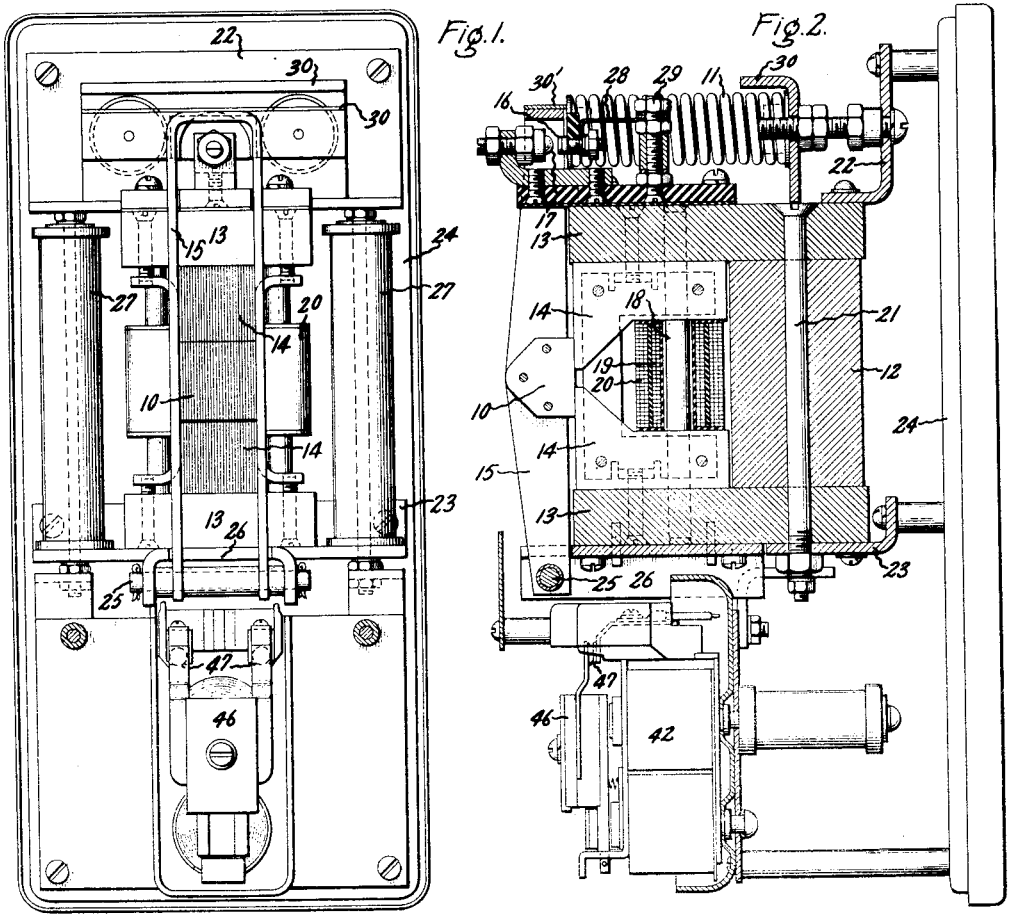
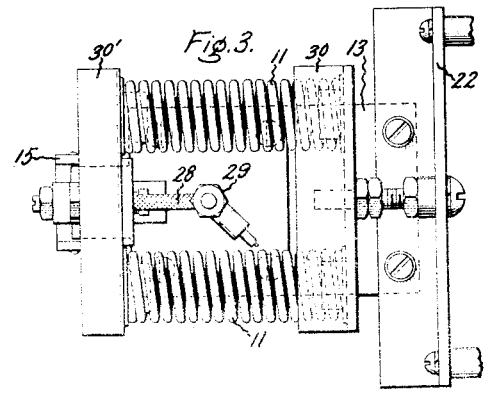
Inventor:
Eugene W. Boehne,
by Harry E. Dunham
His Attorney.

Patented Sept. 20, 1938

2,130,870

UNITED STATES PATENT OFFICE 2,130,870

PROTECTIVE CONTROL DEVICE AND SYSTEM

Eugene W. Boehne, Yeadon, Pa., assignor to General Electric Company, a corporation of New York Application August 4, 1936, Serial No. 94,219

11 Claims. (Cl. 175—294)

My invention relates to improvements in control devices and systems and more particularly to control devices and systems for large capacity, high voltage circuit breakers whereby to provide improved and high speed control for opening the circuit breakers.

Large capacity, high voltage circuit breakers for transmission lines such as the 287.5 kv. lines extending from Boulder Dam must open quickly, particularly under faulty line conditions. High speed circuit breakers for this kind of service require such large forces for opening and closing that a separate operating mechanism for each pole of the circuit breaker is practically necessary, particularly from the standpoint of shocks and jars in operation. Naturally the cost of building high operating speed into circuit breakers is considerable. This high speed operation of the circuit breaker would of course be sacrificed by the slow operation of a single trip coil operating on a common trip lever. For high speed operation, a flux opposition type of tripping coil mechanism such as is disclosed in my application, Serial No. 94,220 filed August 4, 1936, for High speed tripping system, may be used for each pole of the circuit breaker. Such single pole tripping mechanisms require a tripping current of the order of 40 amperes D. C. Thus for a three-phase circuit the trip current would be about 120 amperes. Existing fault responsive protective relays and particularly high speed relays are not built to handle such large currents. Even if they could be so built on an economical basis, it would probably be at a sacrifice in their speed and protective features.

In accordance with my invention, I provide a high speed, large current capacity, magnetic control device which can be readily controlled by any high speed fault responsive relay or otherwise to effect the tripping of a high speed circuit breaker in a time commensurate with the circuit breaker opening time. Further in accordance with my invention, I provide a control system whereby the tripping of a plurality of circuit breakers and particularly single pole circuit breakers in a polyphase circuit can be so quickly initiated as to match the high speed operation built into the circuit breaker itself. These and other objects of my invention will appear in more detail hereinafter.

My invention will be better understood from the following description when considered in connection with the accompanying two sheets of drawings, and its scope will be pointed out in the appended claims.

In the accompanying drawings, Fig. 1 is a front elevation of a control device embodying my invention; Fig. 2 is a side elevation partly in cross-section of the control device shown in Fig. 1; Fig. 3 is a top plan view of the embodiment of my invention shown in Figs. 1 and 2; and Fig. 4 illustrates diagrammatically a control system embodying my invention.

In the illustrated embodiment of my invention, I have shown a magnetic device comprising an armature 10 which has the optimum area for maximum attractive force and which, upon being moved to the attracted position, is maintained therein against the bias of suitable means such as springs 11 by a magnetic structure comprising a magnetic element 12, polar extensions 13, and pole pieces 14. This magnetic structure is so designed as to produce, at the armature, a flux which produces the maximum attractive force for the optimum armature area. While I may use an electromagnetic structure with a suitable energizing winding on the element 12, I have chosen, in the illustrated embodiment of my invention, to show this element as a permanent magnet, since the use of such avoids the losses in energy and difficulties due to heating attendant upon a device continuously energized by electric current. The device is, therefore, particularly adapted to locations where battery potential is at a premium. In order to combine maximum coercive force with minimum space requirements, the magnetic element 12 may be an aluminum-nickel-cobalt-iron alloy, such as disclosed, for example, in United States Letters Patent No. 1,968,569, issued July 31, 1934, on an application filed by W. E. Ruder.

For control purposes, the armature 10 is suitably mounted, as, for example, on a pivoted yoke 15 which carries a contact 16. This contact cooperates with a suitably mounted and adjustably positioned contact 17. In the particular arrangement illustrated by way of example, the contacts 16 and 17 engage upon movement of the armature 10 from the attracted position under the bias of the compression springs 11, although it will be obvious that this movement of the armature could just as well effect a contact separation, if desired. In order to obtain high speed of operation, the contact gap may be relatively small, for example, of the order of one thirty-second of an inch and the spring bias large. This latter feature naturally requires a relatively large magnetic force to hold the armature in the attracted position, as well as a greater force to move it to the attracted position.

In order to actuate the armature for contact controlling movements thereof, I provide means for opposing the flux of the magnetic structure in the armature sufficiently to effect the release thereof and for increasing the flux in the armature when in the unattracted position sufficiently to return the armature to the attracted position. As shown, the flux changing means includes a shunt flux path, such as a magnetic member 18, which is arranged to be energized by one or more windings 19 and 20. If the inner or releasing winding 19 be energized by a unidirectional current in such a direction that the ends of the shunt magnetic member 18 are polarized oppositely to the permanent magnet 12, then the flux of the magnet 12 in the armature 10 will be so opposed as to effect the release and movement of the armature to the unattracted position under the bias of the springs 11. If now the inner winding 19 or another winding, such, for example, as the outer winding 20, be energized by a unidirectional current in such a direction that the ends of the shunt magnetic member 18 are polarized similarly to the permanent magnet 12, then enough flux will be added to that already passed through the armature 10 by the magnet 12 to move the armature to the attracted position against the bias of the springs 11. Of course, in the attracted position the additional flux is not required because of the air gap reduction. Consequently, the reset winding 20 need not remain energized. In order to expedite flux changes in the armature 10 and the pole pieces 14 which the armature engages so as to obtain the quickest response, these parts are, as shown more clearly in Fig. 1, preferably laminated, the magnetic path is made as short as possible, and the armature contact area is the optimum. To further expedite the speed of operation, the releasing winding 19 is designed with an optimum number of turns, such that the flux required to trip the armature can be established in the fastest possible time for the voltage available. Because of the relatively few turns required to satisfy this condition, the resistance of the releasing winding 19 is correspondingly low and the current in the winding circuit must be limited by suitable means such as an external resistance 27 connected in series with the winding.

It will be apparent from the configuration of the magnetic structure that when the coil 19 is energized, it produces a flux flow, roughly in the form of a figure 8. Part of this flux is in the same direction as the flux in the permanent magnet 12 and is therefore additive, and part opposes the flux in the armature 10, thereby causing the armature to be released under the action of the biasing springs 11. The paths and magnitudes of all fluxes can be calculated separately, and the net flux in any path follows the simple laws of superposition or algebraic addition. In the device under consideration, the major part of the flux of the winding 19 flows in the short low-reluctance laminated circuit of the armature 10, instead of in the longer massive high-reluctance circuit of the permanent magnet 12. The use of a magnetic alloy, such as heretofore mentioned, is therefore desirable, since its reluctance is a great many times that of the steel core of an equivalent electromagnet. This allows a higher percentage of the trip coil flux to flow in the armature circuit hence producing faster flux neutralization and faster tripping.

As illustrated, the foregoing magnetic structure is assembled in a compact form and held together by a suitable means, such as a bolt 21. Upper and lower brackets 22 and 23, respectively, serve as a means for mounting the device on a base 24. The armature pivot 25 may be mounted on a supporting plate 26 secured to the lower pole piece 13. Resistances 27 may be mounted on the lower bracket 23. As shown, the adjustably positioned fixed contact 17 is mounted on but insulated from the upper pole piece 13. A transverse member 30', which is secured to the armature yoke 15 and bears against the outer ends of the springs 11, serves as a support for the movable contact 16, which is suitably insulated. The movable contact 16 is connected through a flexible lead 28 to a stationary terminal 29, also mounted on but insulated from the upper pole piece 13. The springs 11 are carried on an adjustably positioned plate member 30 which is supported by the upper bracket 22.

Referring now to Fig. 4, which diagrammatically illustrates an embodiment of my invention in a circuit breaker control scheme using the device shown in Figs. 1, 2, and 3, each of the conductors 32 of a polyphase circuit is provided with a single pole circuit breaker 33 which may have its own independent closing mechanism. So far as my invention is concerned, the type of circuit breaker is immaterial, but in general, it will be a high speed circuit breaker provided with some means, such as the latch 34, for holding it closed against an opening bias and a trip coil 35 for releasing the latch under predetermined circuit conditions or otherwise. However, for illustrating my invention, I have shown in schematic form a tripping magnet such as is disclosed in my aforesaid application. This tripping magnet comprises an armature 50 pivotally secured to the latch 34, a permanent magnet 51, laminated pole pieces 52 against which the armature seats in the attracted position, and a shunt flux establishing path such as a core, not shown, on which the trip coil 35 is mounted. A supplementary trip coil 35', similar to the trip coil 35, may also be provided on the shunt flux path. It will be apparent that the features of magnet construction are exactly the same as those of my magnetically controlled device heretofore described. Since the condition of optimum turns in the trip coils 35 and 35' render these windings of relatively low resistance, suitable current limiting means such as resistances 53 and 53', respectively, may be included in series with these coils. Each circuit breaker may be provided with auxiliary switching means, such as contacts 36, 36', 37 and 37', which are closed when the circuit breaker is closed and open when the circuit breaker is open, and contacts 38 and 38' which are open when the circuit breaker is closed, and vice versa. For reasons which will appear hereinafter, it is necessary that none of the contacts 38 closes until after the contacts 36 and 37 of the same circuit breaker are open.

For energizing all of the trip coils 35 simultaneously so as to trip all circuit breakers at the same time, I connect the trip coils 35 in parallel to one side of the control bus, positive in the drawings, through the respective circuit breaker auxiliary contacts 36 and to the other side, negative in the drawings, of the control bus through the contacts 16 and 17 of a control device like that shown in Figs. 1, 2, and 3. For controlling this device in response to predetermined circuit conditions or otherwise, I connect the releasing winding 19 in a circuit from one side of the control bus through all the circuit breaker auxiliary switch contacts 37 in series, the contacts 40 of a protective relay 41 or the contacts 42 of a manually or otherwise operated switch 43, and the resistance 27 to the other or negative side of the control bus. Obviously, the protective relay 41 may be of any suitable type for the purpose at hand, and any number of protective relays may be employed with their contacts in parallel or otherwise depending upon the particular scheme of protection. However, for simplicity, I have shown only one protective relay of the simple overcurrent type energized from a current transformer 44 in one of the phase conductors 32. The resistance 27 is included in order to reduce the current in and also the time constant of the circuit of the releasing winding 19, whereby to hasten the build-up of flux by this winding, and thereby increase the speed of action of the device. In order further to accelerate the build-up of a large flux in the releasing winding 19 so as to speed the action of the device, I may include across the control source a capacitance 45, which is normally charged and so connected as to discharge into the winding 19 upon the closing of the contacts 40 of the protective relay or the contacts 42 of the trip switch 43. In this way, the condenser 45 acts as a supplemental energy reservoir for the trip coil 19 in addition to the current which flows in the winding from one side of the bus to the other. For the same purpose, there may be connected in like manner across the trip coils 35 and the contacts 16 and 17 of the control device a capacitance 54 which, as shown, is connected between the end of the resistance 53 nearer the trip coils 35 and the positive control bus.

In accordance with my invention, I so arrange that, upon the opening of all the circuit breakers, the control device is reset; that is, its armature 10 is restored to the attracted position with the contacts 16 and 17 open. For this purpose, I provide an auxiliary relay 46, whose contacts 47 control the circuit of the reset winding 20. The circuit of the auxiliary relay winding is through the circuit breaker auxiliary contacts 38 in series so that this relay can not be energized until all the circuit breakers are fully tripped and opened. This relay 46 is shown in Figs. 1 and 2 as of the hinged armature type and may be mounted on the base 24 in any suitable manner. A current limiting resistance 48 may be included in series with the winding of this relay depending upon the voltage rating of its windings and the voltage of the control source.

Assuming the parts positioned as shown in Fig. 4 and that a fault on the circuit 32 effects the operation of the protective relay 41 or that the switch 43 is operated to close its contacts, then the circuit of the tripping winding 19 will be completed through either the contacts 40 or 42. This winding quickly builds up its opposing flux by virtue of the small time constant of the circuit of the winding and the discharge of the charged capacitance 45 whereby to release the armature 10 so as to close the contacts 16 and 17. As soon as these close, all of the trip coils 35 are immediately connected in parallel across the control buses through the respective circuit breaker auxiliary contacts 36 and the condenser 54 discharged into the trip coils whereby to trip the circuit breakers very quickly. As soon as the circuit breakers have all opened, the auxiliary switch contacts 36 will be opened to interrupt the trip coil circuits and the auxiliary switch contacts 38 will be closed to complete the circuit of the auxiliary relay 46 through the closed contacts 16 and 17 of my control device, whereby to effect the energization of the auxiliary relay 46 and thereby the closing of its contacts 47. As soon as these contacts are closed, the circuit of the reset winding 20 is completed, whereby to increase the amount of flux in the armature 10 sufficiently to move the armature to the attracted position and open the contacts 16 and 17. As soon as these contacts are open, the circuit of the auxiliary relay 46 is opened, and this relay opens its contacts 47, whereby to de-energize the circuit of the reset winding 20. The armature 10, having been moved to the attracted position, remains in this position by virtue of the flux established by the permanent magnet 12 and everything is in position ready for reclosing the circuit breaker to effect a subsequent tripping operation as desired.

The supplementary trip coil 35' may be provided when it is desired to open every circuit breaker in case one circuit breaker opens accidentally for any reason whatsoever, such, for example, as mechanical failure, latch failure, and the like. Thus, I may so arrange the circuits of the supplementary trip coils 35' as to effect the energization of these trip coils whenever one circuit breaker opens. For this purpose, when one circuit breaker opens, it may complete through its auxiliary switch contacts 38' and the auxiliary switch contacts 37' of the other circuit breakers, the circuit of an auxiliary control relay 55. As shown, this relay 55, through its circuit closing contacts 56, completes the circuits of all the trip coils 35' in parallel through the current limiting resistance 53', whereby to trip all closed circuit breakers.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. A magnetic device comprising an armature, a magnetic structure for maintaining the armature in the attracted position after it is moved to said position, means biasing said armature for movement from said position, a shunt flux path establishing an additional magnetic circuit through said armature, means for establishing flux in said circuit in a direction to decrease the flux in said armature whereby to effect a release of the armature including a winding and means for accelerating the establishment of flux by said winding, and means for establishing a flux in said circuit in a direction to increase the flux in said armature whereby to return the armature to the attracted position.

2. In combination, a plurality of circuit breakers, a trip coil for each circuit breaker and means for simultaneously energizing all of said trip coils whereby to open said circuit breakers including a magnetic device having an armature normally magnetically maintained in the attracted position, means tending to move the armature from said position, means for releasing said armature from said position, means controlled by the movement of the armature for energizing said trip coils, and means dependent on the opening of all the circuit breakers for returning the armature to the attracted position.

3. In combination, a plurality of circuit breakers, a tripping coil for each circuit breaker and means for simultaneously energizing all of said trip coils whereby to open said circuit breakers including a permanent magnet having an armature normally magnetically maintained in the attracted position, means tending to move the armature from said position, electromagnetic means for releasing said armature from said position, means controlled by the movement of the armature for energizing said trip coils, and electromagnetic means dependent on the opening of all the circuit breakers for returning the armature to the attracted position.

4. In combination, a plurality of circuit breakers, a trip coil for each circuit breaker and means for simultaneously energizing all of said trip coils whereby to open said circuit breakers, including a magnetic device having an armature normally magnetically maintained in the attracted position, means biasing said armature for movement from said position, means for decreasing the flux in said armature sufficiently to release the armature for movement under its bias, means controlled by the movement of said armature for energizing said trip coils, means dependent on the opening of all the circuit breakers for increasing the flux in said armature sufficiently to return the armature to the attracted position, and means controlled by said armature for eliminating said increase in flux when the armature is returned to the attracted position.

5. In combination, an electric circuit comprising a plurality of conductors, a circuit breaker for each of a plurality of said conductors, a trip coil for each circuit breaker and means for simultaneously energizing all of said trip coils whereby to open said circuit breakers including a magnetic device having an armature normally magnetically maintained in the attracted position, means biasing said armature for movement from said position, means for establishing sufficient counter flux in said armature under predetermined circuit conditions to release the armature for movement under its bias, means controlled by the movement of said armature for energizing said trip coils, means dependent on the opening of all the circuit breakers for increasing the flux in said armature sufficiently to return the armature to the attracted position, and means controlled by said armature for eliminating said increase in flux when the armature is returned to the attracted position.

6. In combination, an electric circuit comprising a plurality of conductors, a circuit breaker for each of a plurality of said conductors, a trip coil for each circuit breaker and means for simultaneously energizing all of said trip coils whereby to open said circuit breakers, including a magnetic device having an armature normally magnetically maintained in the attracted position, means biasing said armature for movement from said position, means for establishing sufficient counter flux in said armature under predetermined circuit conditions to release the armature for movement under its bias, means controlled by the movement of said armature for energizing said trip coils, and means dependent on the opening of all the circuit breakers for increasing the flux in said armature sufficiently to return the armature to the attracted position.

7. In combination, an electric circuit comprising a plurality of conductors, a circuit breaker for each of a plurality of said conductors, a trip coil for each circuit breaker and means for simultaneously energizing all of said trip coils whereby to open said circuit breakers including a magnetic device having an armature normally maintained in the attracted position, means biasing said armature for movement from said position, means for establishing enough counter flux in said armature to release the armature for movement under its bias including an operating winding and means for accelerating the establishment of flux by said winding, means controlled by the movement of said armature for energizing said trip coils, and means dependent on the opening of all the circuit breakers for increasing the flux in said armature sufficiently to return the armature to the attracted position.

8. In combination, an electric circuit comprising a plurality of conductors, a circuit breaker for each of a plurality of said conductors, a trip coil for each circuit breaker and means for simultaneously energizing all of said trip coils whereby to open said circuit breakers, including a magnetic device having an armature normally maintained in the attracted position, means tending to move the armature from said position, means for establishing enough counter flux in said armature to release the armature for movement under its bias including an operating winding, a source of direct current for energizing said winding and means for accelerating the establishment of flux by said winding, including a normally charged capacitance connected to said source and means for connecting said winding to said source for discharging said capacitance into said winding in a direction to add to the current flow in the winding from said source, and means dependent on the opening of all the circuit breakers for increasing the flux in said armature sufficiently to return the armature to the attracted position.

9. In combination, an electric circuit comprising a plurality of conductors, a circuit breaker for each of a plurality of said conductors, a quick-acting tripping mechanism for each of said circuit breakers including latching means, means for magnetically retaining said latching means in latching position to hold the circuit breaker closed, and means including a trip coil for quickly establishing an opposing magnetic flux to effect the release of said latching means, and means for controlling said flux establishing means including a magnetic device having a circuit controlling member normally magnetically retained in a predetermined circuit controlling position, and means for quickly establishing an opposing magnetic flux to effect the movement of said circuit controlling member to another circuit controlling position whereby to effect the energization of the trip coils of all of said circuit breakers.

10. In combination, an electric circuit comprising a plurality of conductors, a circuit breaker for each of a plurality of said conductors, a quick-acting tripping mechanism for each of said circuit breakers including latching means, means for magnetically retaining said latching means in latching position to hold the circuit breaker closed, and means including a trip coil for quickly establishing an opposing magnetic flux to effect the release of said latching means, and means for controlling said flux establishing means including a magnetic device having a circuit controlling member normally magnetically retained in a predetermined circuit controlling position, means for quickly establishing an opposing magnetic flux to effect the movement of said circuit controlling member to another circuit controlling position whereby to effect the energization of the trip coils of said circuit breakers and means dependent on the opening of all of said circuit breakers for returning said circuit controlling member to said predetermined circuit controlling position.

11. A switch gear combination for controlling electric circuits including a plurality of circuit breakers each of said circuit breakers having a quick-acting tripping mechanism including latching means, means for magnetically retaining said latching means in latching position to hold the circuit breaker closed and means including a trip coil for quickly establishing an opposing magnetic flux to effect the release of said latching means, means for controlling said flux-establishing means including a magnetic device having a circuit controlling member normally magnetically retained in a predetermined circuit controlling position and means for quickly establishing an opposing magnetic flux to effect the movement of said circuit controlling member to another circuit controlling position whereby to cause the energization of said trip coil, and means controlled by said circuit breakers for restoring said circuit controlling member to said predetermined position when all the circuit breakers are in the circuit open position.

EUGENE W. BOEHNE.